United States Patent [19]

Palm

[11] Patent Number: 4,968,191
[45] Date of Patent: Nov. 6, 1990

[54] CHUCK MOUNT

[75] Inventor: Bernhard Palm, Brookfield, Wis.

[73] Assignee: Milwaukee Electric Tool Corporation, Brookfield, Wis.

[21] Appl. No.: 199,846

[22] Filed: May 27, 1988

[51] Int. Cl.⁵ .............................................. B23B 45/00
[52] U.S. Cl. .................................. 408/124; 403/359; 408/239 R; 279/61
[58] Field of Search ................................ 408/238-240, 408/124; 279/60-65, 1 A, 8, 19.3, 19.5, 7; 409/231, 232, 234; 403/260, 359, 354, 3

[56] References Cited

U.S. PATENT DOCUMENTS

| | | | |
|---|---|---|---|
| 2,684,856 | 7/1954 | Stoner | 279/61 |
| 2,874,985 | 2/1959 | March | 408/359 |
| 4,423,881 | 1/1984 | Whitehead | 279/60 X |
| 4,461,195 | 7/1984 | Barnich | 403/260 X |
| 4,621,818 | 11/1986 | Röhm | 279/62 X |

*Primary Examiner*—Z. R. Bilinsky
*Assistant Examiner*—Robert Schultz
*Attorney, Agent, or Firm*—Bayard H. Michael

[57] ABSTRACT

The chuck body is centered on the power tool drive spindle by placing the smooth bore in the body over the smooth cylinder on the spindle with the recesses on the body axially moved onto the lugs (splines) on the shoulder of the spindle. The retaining screw is threaded into the end of the spindle and the screw head forces the chuck body against the shoulder. Neither the screw nor the bore/cylinder transmit torque; only the drive lugs transmit torque so the chuck can't jam on the spindle. This mount works with keyed chucks or keyless chucks as illustrated where the three inclined jaws are threadably engaged by split nut having a retainer pressed thereon. A clutch sleeve is biased rearward from the split nut and is moved towards the nut to engage interference lugs on the sleeve with lugs on the nut to restrain nut rotation to open or close the jaws. As the jaws approach full open, they push the sleeve to disengage the lugs. A spline coupler restrains sleeve rotation but can be omitted. This chuck construction can mount directly onto standard threaded splindles of existing tools.

2 Claims, 2 Drawing Sheets

CHUCK MOUNT

BACKGROUND OF THE INVENTION

The chuck on electric power drills is customarily mounted by threading the chuck onto the end of the drive spindle until the chuck body seats against a reference surface on the spindle. This squares the chuck relative to the spindle while the threads center the chuck on the spindle. These threads in the chuck body are utilized in manufacture of the chuck for properly positioning the chuck body for final grinding of the jaws so the jaws will be concentric with the spindle.

In use, power is delivered from the motor to the chuck through the threaded engagement. Threads operate as a wedge. The greater the resistance encountered by the chuck the more the threads tend to tighten. While this is true with a regular chuck, it is particularly true with an impacting chuck since such chucks are subjected to force spikes during the impact process. Whatever type of chuck one is discussing, it can be difficult to remove the chuck for service simply because the chuck is thoroughly jammed on the drive spindle and some rather extreme measures may be necessary in order to free the chuck from the spindle. This makes service difficult, expensive and can result in permanent damage to the chuck or to the drill.

Keyless chucks rely on impact to open and close the chuck. The design is such that the impacting is more severe in the reverse direction and the chucks have been known to loosen from the spindle thread resulting in applying that wedging effect on the retaining screw causing it to break.

CROSS REFERENCE

This is an improvement on my U.S. Pat. No. 4,682,918.

This invention is illustrated in conjunction with a novel construction having the interference members or lugs formed as a part of the split nut. That construction feature is claimed in my co-pending application Ser. No. 199,841, filed 5/27/88.

Also disclosed is a novel way to disengage the chuck jaws before they can jam open. That is claimed in my application S.N. 199,842 filed 5/27/88.

SUMMARY OF THE INVENTION

The invention provides a chuck body having a threaded bore which can threadably mount the chuck on a threaded spindle. The bore also has a smooth cylindrical section which fits over a smooth spindle while a separate lug and recess drive serves to transmit torque. Thus the same chuck can be mounted on a threaded or unthreaded spindle.

When used with an unthreaded spindle a feature of this is to separate the functions of center and supporting the chuck on the drive spindle from the function of torque transmission. The support and centering functions are accommodated by placing the smooth bore in the chuck onto a smooth cylinder on the spindle. The drive connection is provided by an axially engaged lug and recess connection which can transmit torque but cannot affect the centering of the chuck.

Another feature of the invention is to provide for accurate grinding of the chuck jaws to have the tool engaging surfaces concentric with the smooth bore. This is done by providing a threaded bore concentric with the smooth bore (by reason of proper tooling). The threaded bore allows the chuck to be mounted on a mandrel during final grinding of the jaws. Now the jaws must be concentric with the chuck body, the smooth bore and the spindle.

The present chuck mount is useful for key operated or keyless chucks. In connection with keyless chucks mounted on an unthreaded spindle, it offers still additional advantages over the art. Since the impacting provided to open the chuck (reverse) is more severe than to close it (forward) chucks have on occasion loosened from the spindle thread. The wedging effect of the spindle thread combined with the impact energy to open the chuck bears directly against the retaining screw which causes a high percentage of the screws to break. This problem is eliminated with this design because the screw is not subjected to any driving torque and its only function is to hold the chuck on the spindle.

To achieve economy of scale standardization is essential. The illustrated chuck mount fits all tools with threaded spindles as well as tools with unthreaded spindles and a lug drive, depending on which portion of the mounting arrangements is used.

DETAILED DESCRIPTION OF THE DRAWINGS

Figure 1:
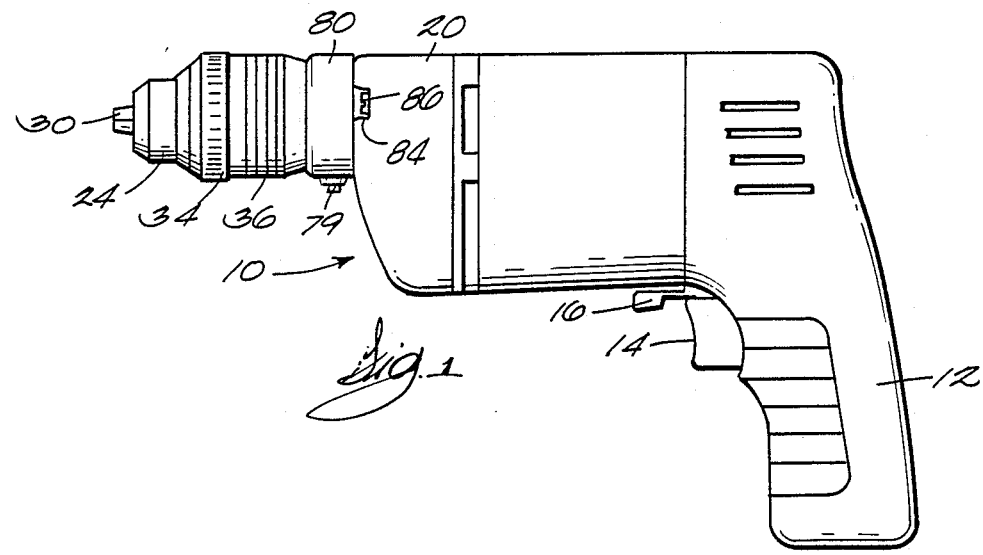
FIG. 1 is a side elevation of a power drill fitted with a chuck incorporating this invention.

The hand drill 10 has a conventional pistol grip 12, a trigger 14 actuating the power switch and a forward-/reverse control 16. Gear case 20 is mounted on the front portion of the drill housing by screws 86 and encloses the customary reduction gearing. Grooves 84 in case 20 give screwdriver access to screws 86. Drive spindle 18 projects out of the front of the gear case 20 and is journaled in bearing 68 retained by tru-arc retainer 69.

The spindle has a smooth cylindrical mount 15 beyond shoulder 17 and a reduced diameter end 19 beyond the mount 15. The spindle is reduced at 21 between mount 15 and shoulder 17 to ensure that face 23 can be squarely engaged by shoulder 25 on chuck body 24 when the smooth bore 27 in the body is mounted on the mount 15. When so mounted the diametrically opposed lugs 29 on spindle 18 engage the slots 31 in the body flange. The threaded bore 35 in the body fits over the reduced end 19 of the spindle 18. The threads 35 serve no purpose at this time; they are used to mount the chuck on a mandrel during production of the chuck to enable final grinding of the jaws concentric with the chuck body so the jaws will be concentric with the spindle 18 when the chuck is mounted on a spindle. The chuck is retained on the spindle 18 by screw 26 threaded into the end of the spindle. No torque is transmitted through the threaded connection of the chuck to the spindle through screw 26. All torque is transmitted through the drive lugs 29. Therefore, the chuck is easily removed by pulling it off and when driven in reverse screws (like 26) can no longer break. This mount is applicable to keyed and to keyless chucks.

The body is provided with three inclined bores 28 in each of which there is mounted a jaw 30 which moves in the inclined bore 28 in response to relative rotation between the split nut 32 and the jaws. Split nut 32 is retained in assembled position by split nut retainer 34 which is in the form of a ring-like collar having a force fit on the split nut. The retainer 34 and the split nut normally rotate with the body 24, but if the split nut and retainer are restrained from rotation the rotation of the body relative to the split nut will cause the jaws 30 to open or close by moving up or down the inclined bore as determined by the direction of the rotation of the body.

Figure 2:
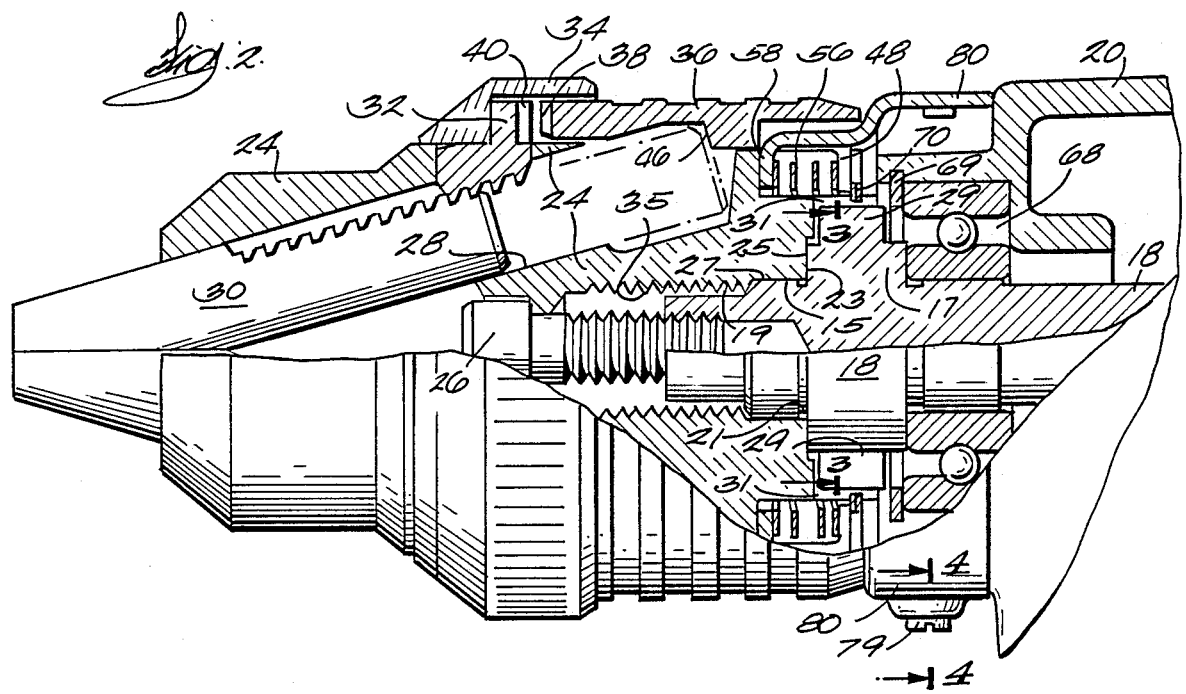
FIG. 2 is a vertical section through the chuck mounted on a novel drive spindle.
Figure 3:
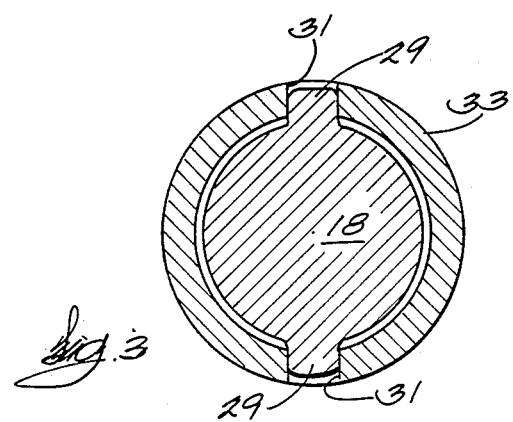
FIG. 3 is a section taken on line 3—3 in FIG. 2.
Figure 4:
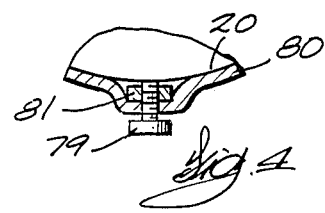
FIG. 4 is a section taken on line 4—4 in FIG. 2.

Clutch sleeve 36 is provided with lugs 38 facing lugs 40 on the split nut 32. If the clutch sleeve 36 is moved to the left in FIG. 2, lugs 38 engage lugs 40. The right end of sleeve 36 has inwardly projecting flange segments 48 and a spline ring 80 has inturned flange segments 58 which fit between segments 48 with spring 56 compressed between the spring seats thus provided. Spline ring 80 can be restrained against rotation by tightening screw 79 into nut 81 until it firmly engages gear case 20. This restrains the sleeve 36 against rotation. Therefore, when the sleeve lugs 38 engage the split nut lugs 40, the split nut 32 will also be restrained against rotation causing relative rotation between the body 24 and the split nut 32. This will cause the jaws 30 to move up or down the inclined bores 28 to open or close the jaws depending upon the direction of rotation of the clutch body 24.

Figure 5:
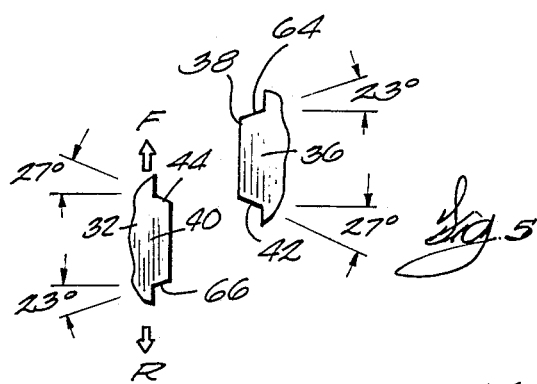
FIG. 5 is a fragmentary schematic view of the lugs.

In FIG. 5 details of lugs 38 and 40 are shown. The jaws 30 will open or close depending upon whether spindle 18 and chuck body 24 are being driven in the forward (F) or reverse (R) direction. Assume the chuck is being driven in the forward (F) direction. Interengaging faces 42, 44 on lugs 38, 40, respectively, are inclined at 27° with respect to the axis of the chuck, as seen in FIG. 5. This is a rather steep angle and will deliver a very sharp impact to the lugs 40 tending to forceably close the jaws. When the jaws grip a tool and cannot move, the face angles will act to cam the clutch sleeve 36 towards the gear case to disengage the lugs. If the operator continues to push the clutch sleeve 36 towards the split nut, non-rotating lugs 38 will re-engage the split nut lugs 40 and deliver repeated impacts. This will repeat as long as the operator persists. This construction will deliver sufficient closing force to the jaws to meet all normal requirements.

Opening the chuck is another matter. In this design the forward/reverse switch 16 is actuated to now drive the chuck in reverse direction (R). This means that when the axially movable sleeve 36 is actuated to bring the non-rotating lugs 38 into engagement with the split nut lugs 40, the inclined faces 64, 66 are inclined at 23° to the axis of the chuck, as may be seen in FIG. 5. This is 4° less than the angle in the jaw closing configuration. This will develop more tangential force on the split nut 32 in the direction opening the jaws than obtained with the 27° face angle in the closing direction. Therefore, opening is assured and there is no need to provide for operation of the chuck with a key or a chuck wrench. The system will deliver sufficient, repeated impacts to open the chuck. It may not open on the first impact, but with the operator holding the sleeve forward, a rapid series of impacts will be delivered until the chuck opens.

An impact can be considered a force spike of much greater magnitude than the friction between the parts. A problem arises, however, if the operator holds the sleeve 36 to drive the jaws 30 to the full open position. Without the present invention, this can result in the jaws wedging in the open position. Since they have been driven open with an impact greater than can be delivered in the closing direction, they can be irrevocably wedged in the open position. This problem is obviated in the present design by locating the clutch sleeve in position to be engaged by the jaws and providing the undercut 46 inside the clutch sleeve 36 in position to receive the inner end of each jaw 30, as shown in dotted lines in FIG. 2. This, then, permits the jaws to drive against the clutch sleeve 36 to push the sleeve to the right to disengage lugs 38 from lugs 40 before there is opportunity to wedge the jaws open. This automatic disengagement prevents a user from inadvertently locking the jaws in the open position. It will be noted that the inner end of jaw 30 has contact with the sleeve in a plane normal to the jaw movement and wedging is not possible.

Reference has been made to the fact that the sleeve 36 is biased rearwardly (to the right). That construction will now be described. The flange segments 48 on the right hand end of the sleeve 36 form a spring seat for the compressed spring 56. The spring also seats on segments 58 which are axially fixed. Therefore the spring biases the sleeve 36 to the right with retainer ring 70 limiting travel to the right. The clutch sleeve 36, spring 56, ring 70 and ring 80 are assembled on the chuck before the chuck is mounted on the spindle.

Another important feature is the nature of the clutch sleeve 36. The spline ring 80 prevents rotation of the clutch sleeve and when the user pushes the sleeve forward to engage the lugs the sleeve is subject to reciprocating motion as the lugs engage, impact and push the sleeve back and then the user pushes it forward again. If desired the ring 80 can be allowed to rotate. This will result in the clutch sleeve being free to rotate slightly due to impact. The slight rotational force imparted to the sleeve is resisted by the user who can't detect or feel the difference. There is some loss of impact force or magnitude due to the slight rotation of the sleeve on impact.

There are many drills in the field which don't have the grooves leading to the screws. Therefore, a keyless chuck mounted without means to restrain rotation of the clutch sleeve 36 remains a desirable product.

The mounting of the chuck on the smooth cylinder and driving the chuck through the lugs prevents wedging the chuck on the spindle. Screw 26 will not wedge or jam; it transmits no torque, it only retains the chuck on the spindle. Chuck removal is easy and yet the design retains the threads 33 necessary to proper finish grinding of the jaws concentric with the chuck spindle. It is important to note that without any modification to the chuck the threads 33 can be used to mount the chuck on threaded spindles of existing tools.

Figure 6:
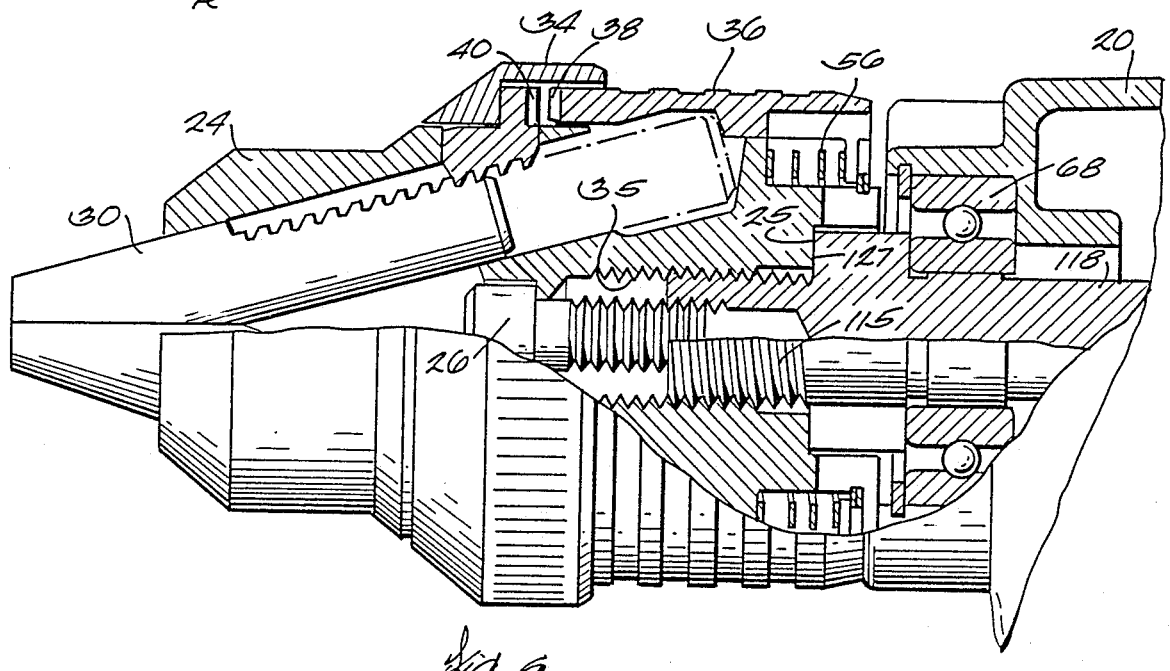
FIG. 6 is a vertical section through a slightly modified chuck (not modified relevant to the mount) threaded on a standard threaded spindle.

This is illustrated in FIG. 6 in which spindle 118 has only the threaded end 115 which threads into the body threads 35 until the shoulder 25 seats against shoulder 123. There are no drive lugs in this configuration ... the drive is transmitted through the threads and this entails the drawbacks mentioned above. The construction has a ready market in all the threaded spindle tools in the field. This chuck also omits the spline ring 80 of FIG. 2 which means sleeve 36 is free to rotate but can be restrained by the user with little force. The chuck still offers the advantage of avoiding delivering impact force through the press fit and providing automatic disengagement.

The important feature of this invention is the automatic disengagement of the sleeve before the jaws have an opportunity to get wedged in the full open position. Another important feature of this invention is the nature of the clutch sleeve 36. The spline ring 80 prevents rotation of the clutch sleeve and when the user pushes the sleeve forward to engage the lugs the sleeve is subject to axial reciprocating motion as the lugs engage, impact and push the sleeve back and then the user pushes it forward again. The cost of restraining rotation can be avoided by omitting the spline ring. This will result in the clutch sleeve being free to rotate. The slight rotational force imparted to the sleeve is resisted by the user who can't detect or feel the difference. There is some loss of impact force or magnitude due to the slight rotation of the sleeve on impact. Also, some users are reluctant to grasp a rotating part and for them the non-rotational sleeve is preferred.

Figure 7:
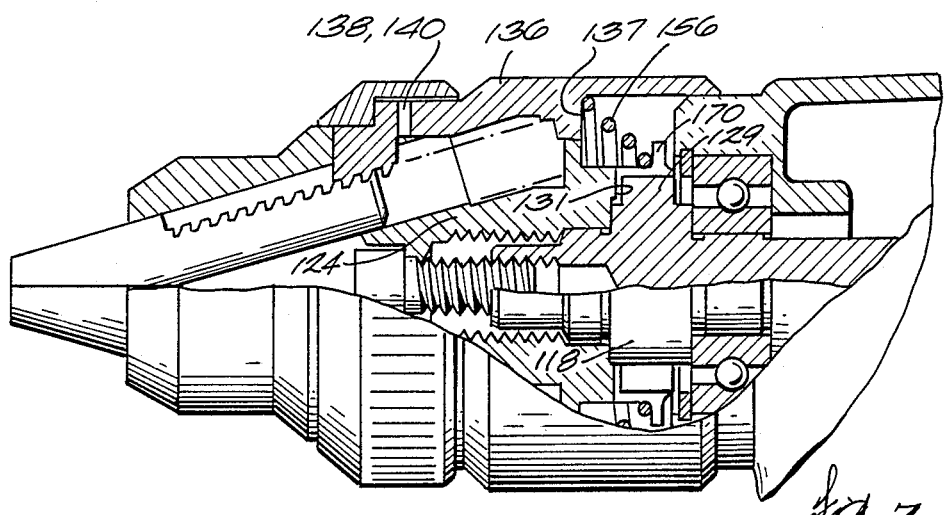
FIG. 7 is a vertical section through still another chuck.

Another variation, and a great simplification, is shown in FIG. 7 in which spring 156 biases the sleeve 136 to engage the lugs 138, 140 at all times with the jaws still operative to disengage the lugs before they can jam open. Spring 156 is compressed between the corner 137 (inside the sleeve) and the shoulder 170 machined on the body 124. This is the lug drive version but it can be either. The lugs 129 engage the recesses 131. The sleeve 136 normally rotates with the chuck and the user then restrains the sleeve to open or close the chuck.

The sequence of the drawing figures parallels this development and FIG. 7 represents the final (current) design. This is more compact and "looks" more conventional. It still mounts on threaded or unthreaded spindles, automatically disengages, and avoids torque transmission through the press fit.

This design also has an advantage in that the radial slots 131 permit screw driver blade access to the spring 156 when the chuck is off the drive spindle. The spring can be removed for service in this manner. The chuck can't be mishandled to damage the spring when the chuck is off the tool. Thus, if the sleeve is pulled back, spring 156 "goes solid" and limits sleeve travel and this in turn prevents overstressing the spring.

I claim:
1. A power tool including,
   a housing,
   a chuck,
   an electric motor in said housing,
   a drive spindle driven by said motor and projecting from said housing, the distal end of said spindle being unthreaded,
   a smooth mounting cylinder integral with said drive spindle and located adjacent said distal end and having a diameter larger than said distal end,
   a shoulder on said mounting cylinder and having an annular surface substantially normal to the axis of said drive spindle,
   said chuck including a chuck body having a rear face,
   an axial hole in said chuck body having a smooth bore adjacent said rear face fitting over and centered on and by said mounting cylinder,
   said axial hole also having a threaded section adjacent and forward of said smooth bore, said threaded section having no operative connection to said spindle,
   a screw engaging said chuck body and extending into said axial hole and threaded into engagement with said distal end of said spindle to hold said rear face of said chuck body against said annular surface,
   and drive means on said face and said shoulder for transmitting torque from the spindle to the chuck.
2. A power tool including,
   a housing,
   a chuck,
   a motor in said housing,
   a rotatable drive spindle driven by said motor about the axis of the spindle and projecting from said housing with a smooth cylinder at its distal end,
   a rotatable chuck having jaws for holding a tool on the axis of the chuck and having a smooth bore mounted on said cylinder to center the chuck on the spindle,
   axially engageable drive means on said chuck and said spindle for transmitting torque from the spindle to the chuck,
   means retaining and axially fixing said chuck on said spindle without transmitting torque through said retaining means,
   means limiting axial movement of said members to position said cylinder in said bore,
   said retaining means comprising a screw having a screw head engaging said chuck and having a threaded shank extending axially from said chuck into said spindle to draw said chuck onto said spindle until limited by said limiting means,
   said bore and said jaws having the same centerline,
   and a threaded bore in said chuck concentric with said smooth bore but having a smaller diameter.

* * * * *

UNITED STATES PATENT AND TRADEMARK OFFICE
CERTIFICATE OF CORRECTION

PATENT NO. : 4,968,191
DATED : November 6, 1990
INVENTOR(S) : BERNHARD PALM

It is certified that error appears in the above-identified patent and that said Letters Patent is hereby corrected as shown below:

Column 1, line 56, after the word "this" insert the word --invention--

Column 1, line 56, the word "center" should read --centering--

Signed and Sealed this

Seventh Day of April, 1992

Attest:

HARRY F. MANBECK, JR.

*Attesting Officer*  *Commissioner of Patents and Trademarks*